United States Patent

Gradisching

Patent Number: 5,844,895
Date of Patent: Dec. 1, 1998

[54] ATM COMMUNICATIONS NETWORK

[75] Inventor: Klaus David Gradisching, Gauting, Germany

[73] Assignee: Siemens Aktiengesellschaft, Munich, Germany

[21] Appl. No.: 673,346

[22] Filed: Jun. 28, 1996

[30] Foreign Application Priority Data

Jun. 30, 1995 [DE] Germany ......................... 195 23 986.5

[51] Int. Cl.⁶ ...................................................... H04J 3/12
[52] U.S. Cl. ..................... 370/385; 370/410; 370/522; 379/229
[58] Field of Search ...................................... 370/217, 218, 370/522, 410, 524, 384, 385, 395, 397, 399, 409; 379/229, 230

[56] References Cited

U.S. PATENT DOCUMENTS

| | | | |
|---|---|---|---|
| 5,282,244 | 1/1994 | Fuller | 379/230 |
| 5,384,840 | 1/1995 | Blatchford et al. | 379/229 |
| 5,535,200 | 7/1996 | Gardiner | 370/410 |
| 5,541,987 | 7/1996 | Topper et al. | 370/236 |
| 5,615,213 | 3/1997 | Griefer | 370/524 |
| 5,650,998 | 7/1997 | Angenot | 370/522 |
| 5,659,542 | 8/1997 | Bell et al. | 370/522 |

Primary Examiner—Chau Nguyen
Assistant Examiner—Kenneth Vanderpuye
Attorney, Agent, or Firm—Hill & Simpson

[57] ABSTRACT

The ATM communications network (NW) has a plurality of network nodes (NK1, NK2, NK3) connected with one another via at least one transmission medium, which respectively represent at least one signaling point, corresponding to a defined outband signaling. At least one virtual channel is respectively provided on the respective transmission medium between adjacent signaling points for the transmission of signaling information defined according to a network protocol and of network management information. At least one further virtual channel, allocated exclusively to the network management information, is respectively reserved on the respective transmission medium for the transmission of the network management information between adjacent signaling points.

18 Claims, 2 Drawing Sheets

ATM COMMUNICATIONS NETWORK

BACKGROUND OF THE INVENTION

The present invention concerns a communications network operating according to an asynchronous transfer mode.

In such a communications network, a network protocol can be provided for the transmission of signaling information during an outband signaling and of network management information, as proposed for example by the ITU recommendations Q.700, Q.701 and Q.704. Through these recommendations, what are known as signaling points are defined within a communications network, which points are represented by the network nodes belonging to this communications network. In connection with narrow-band communications networks, it was thereby proposed through these ITU recommendations to provide up to 16 of what are called signaling links between adjacent signaling points. These links can be either separate physical circuits or transmission channels on transmission circuits used in time division multiplex operation, in order to make available a redundant system in the case of failure of individual links, and to make available a higher transmission capacity, since the bandwidth on the individual signaling links in narrow-band communications systems is as a rule limited to 64 kbit/s.

SUMMARY OF THE INVENTION

It is an object of the present invention to provide a communications network that optimizes transmission of signaling information and network management information.

In general terms the present invention is a communications network operating according to an asynchronous transfer mode, having a plurality of network nodes connected with one another via at least one transmission medium, which, corresponding to a defined outband signaling, respectively represent at least one signaling point. At least one virtual channel is respectively provided on the respective transmission medium between adjacent signaling points for transmission of signaling information defined according to a network protocol and for transmission of network management information. At least one further virtual channel, allocated exclusively to the network management information, is respectively reserved on the respective transmission medium for the transmission of the network management information between adjacent signaling points.

The present invention has the advantage that through the separate transmission of the network management information and of the other signaling information corresponding to the network protocol used, the individual information can be supplied directly to the relevant means (hardware platforms). The internal transport system in the individual signaling points (network nodes) is thereby relieved of stress. In contrast, during a common transmission of all information, a distributor would have to be provided in order to evaluate the individual information and to supply these to the respectively allocated means.

Advantageous developments of the present invention are as follows.

A plurality of transmission media is provided respectively between adjacent signaling points. At least on one part of these transmission media respectively, at least one virtual channel is reserved exclusively for the transmission of network management information.

For the case in which at least one decentral information processing means, as well as a central network management means, are provided in the respective signaling point, network management information transmitted in the respective virtual channel is supplied directly to the central network management means.

The network management information supplied to the associated network management means is monitored by the respective information processing means, in order to be able to directly react to it.

For broadcasting network management information from a signaling point to adjacent signaling points on the relevant transmission media, at least one further virtual channel is additionally reserved. The distribution of the network management information to the individual transmission media is carried out through a corresponding adjustment of a coupling network associated with the relevant signaling point.

For broadcasting network management information from a signaling point to all adjacent signaling points, as well as, to a group of adjacent signaling points, excluding at least one of the adjacent signaling points, different virtual channels are reserved on the respective transmission medium.

For the case in which one of the adjacent signaling points is to be excluded for a broadcasting of network management information from a transmitting signaling point, the exclusion of this signaling point is effected through a corresponding adjustment of the coupling network associated with the transmitting signaling point.

For the case in which one of the adjacent signaling points is to be excluded for a broadcasting of network management information from a transmitting signaling point, all the adjacent signaling points are included in the broadcasting. However, address information is contained in the network management information, which address information designates that signaling point in which the network management information is to be ignored.

A flow control is carried out during the transmission of network management information via the respective virtual channel.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
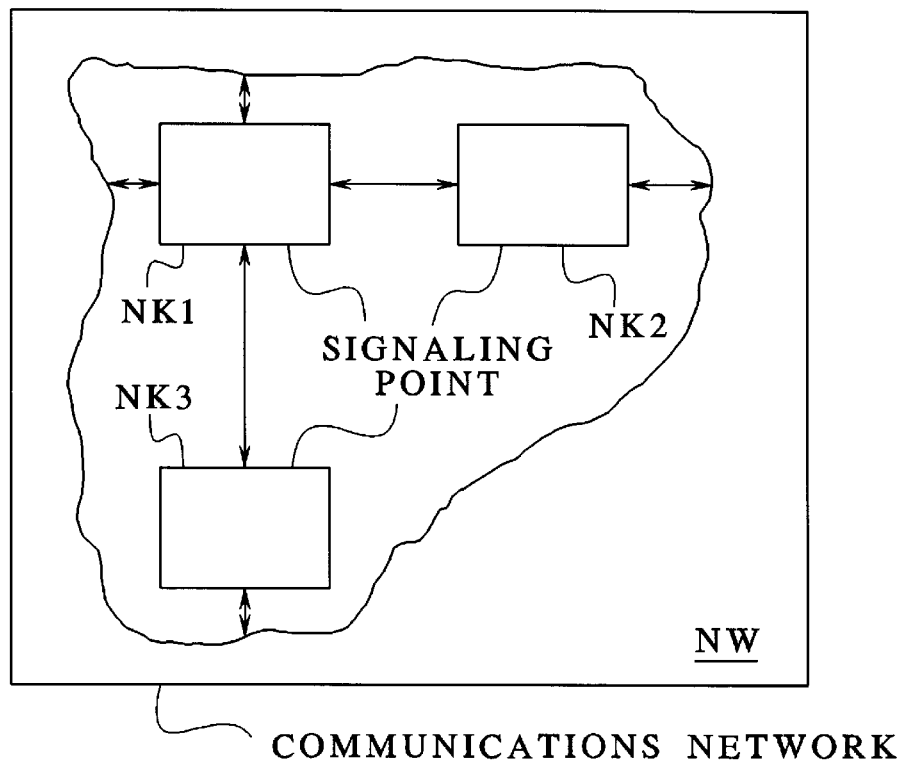
FIG. 1 shows a communications network, schematically represented through signaling points connected with one another, in which the present invention is used.

The following is based on a communications network NW that operates according to an asynchronous transfer mode (ATM) and that has a number of network nodes connected with one another. In FIG. 1 three network nodes, designated NK1, NK2 and NK3, are schematically represented as an example. These network nodes are connected with one another at least via a bidirectionally operating transmission medium, which can also be formed as a transmission medium pair having two transmission media allocated to one another and operating in opposite directions of transmission. The transmission media can be formed for example from electrical or optical transmission circuits. Virtual channels corresponding to the ATM principle are provided on the respective transmission medium. Useful information and signaling information are transmitted in the form of cells in the virtual channels. Since the structure of cells and their transmission in virtual channels is generally known, this is not further discussed below.

An outband signaling is provided in the communications network NW, as proposed for example by the ITU-T recommendations Q.700, Q.701 and Q.704 as signaling system no. 7. In this signaling system, signaling information and useful information are transmitted separately, and also, if warranted, via different network nodes within the communications network. In the relevant transmission media for the transmission of signaling information, at least one separate virtual channel is thereby respectively reserved for the transmission of this signaling information.

According to the above-identified ITU-T recommendations, what are known as signaling points are defined for the processing of signaling information, which points are represented by the network nodes shown in FIG. 1. Adjacent signaling points thereby communicate via at least one previously identified separate virtual channel, which is reserved on the respective transmission medium, (schematically shown in FIG. 1) and, if warranted, exists separately per transmission direction.

Besides general signaling information, also including for example signaling information for the setup and clearing of useful connections, the transmission of network management information between adjacent signaling points is also provided in a network protocol (message transfer part, MTP) defined by the above-identified ITU-T recommendations. This network management information, which is defined in the MTP level 3, is transmitted between the individual signaling points in order to carry out a corresponding updating of the network configuration, for example, through the modification of routing tables in the individual signaling points (network nodes), in the event of changes arising in the communications network NW, for example due to a failure of connection paths or, respectively, a renewed availability of connection paths. Examples of such network management information include messages concerning inaccessibility (transfer prohibited message) or, respectively, renewed accessibility (transfer allowed message) of determined destinations of the signaling point emitting these messages.

According to the present invention, it is provided that for the transmission of network management information between adjacent signaling points, if warranted at least one further separate virtual channel is reserved per transmission direction, which channel is allocated exclusively to network management information. Through the separate transmission of the network management information and the remaining signaling information provided corresponding to the network protocol in use, there is the possibility of supplying the individual information directly to the relevant means (hardware platforms). In this way the internal transport system in the individual signaling points (network nodes) is relieved of stress.

Figure 2:
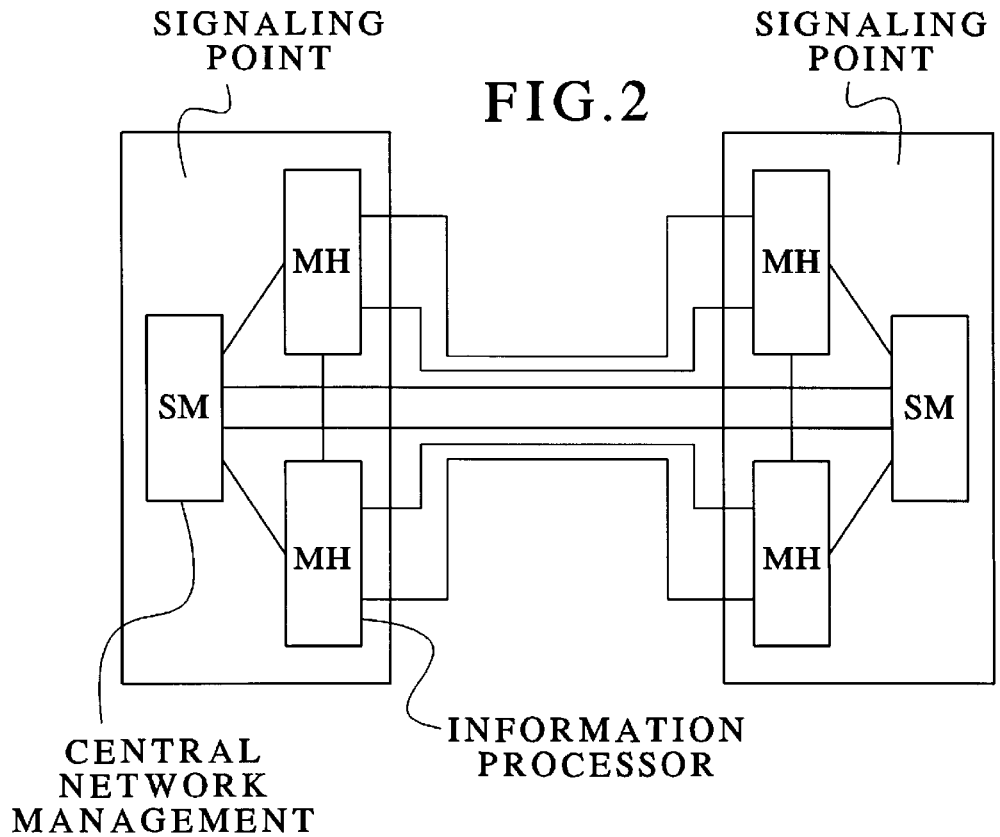
FIG. 2 shows an exemplary embodiment for the transmission of network management information during point-to-point connections between two adjacent signaling points.

FIG. 2 shows an exemplary embodiment for the transmission of network management information between two adjacent signaling points during a point-to-point connection. In this exemplary embodiment, it is provided for reasons of redundancy that a plurality of transmission media is provided between the two signaling points, and at least on a part of these transmission media (two are shown as an example) respectively at least one virtual channel is reserved exclusively for the transmission of network management information. Here, as well as in the exemplary embodiments explained below, the transmission media can thereby also be constructed as a transmission medium pair in the way indicated above, if warranted.

In addition, in FIG. 2, also representative for the exemplary embodiments indicated in the other figures, it is shown that as an exemplary embodiment a decentral information processing means MH (message handler) and a central network management means SM (signaling network manager) are provided per transmission medium in each of the signaling points. The network information transmitted in the relevant virtual channel is thereby supplied directly to the central network management means SM, by which the network management information is evaluated. Thereupon, if warranted, a modification, already mentioned above, of the network configuration (for example, modification of routing tables in its own signaling point, as well as in the adjacent signaling points) is carried out. The aim of the respective information processing means MH is to receive the remaining signaling information already mentioned above and, according to the address information (point codes) contained therein, to forward the signaling information either to internal means or to an adjacent signaling point. For the latter, routing tables are controlled in the respective information processing means, which tables are maintained in the current state by the associated central network management means. In addition, it is to be noted that the already-named means can be implemented both by the hardware and by the software.

Figure 3:
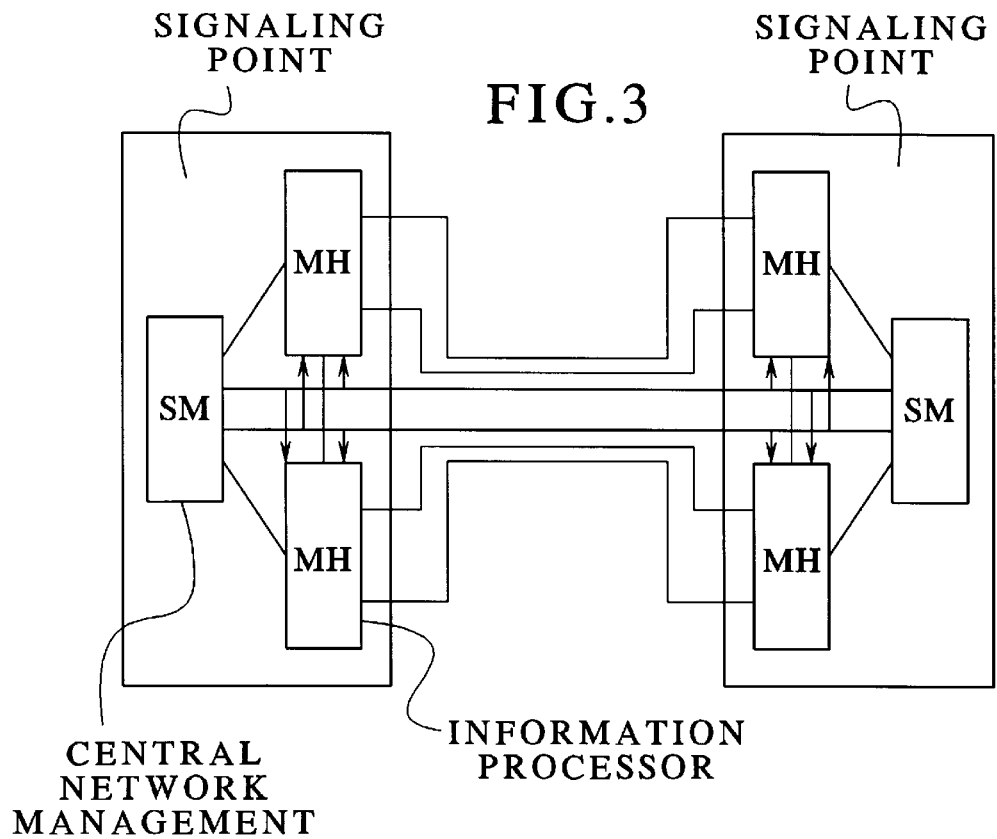
FIG. 3 shows a further exemplary embodiment for the transmission of network management information during point-to-point connections between two adjacent signaling points.

FIG. 3 schematically shows a further exemplary embodiment for the transmission of network management information between two adjacent signaling points during a point-to-point connection. This exemplary embodiment differs from that shown in FIG. 2 only in that here the network management information supplied to the associated signaling point is monitored by the respective decentral information processing means MH at the receiving side, without however themselves acting according to the network protocol. However, the respective information processing means can react directly to the recognition of important network management information, by which for example an inaccessibility of determined destinations is displayed, in that for example signaling information that are to be forwarded to currently inaccessible destinations (signaling points), are held back until these destinations are again cleared by the associated network management means SM, through an updating (already mentioned above) of the routing tables. As a result, misrouting of signaling information, and thereby the loss thereof, is avoided.

Figure 4:
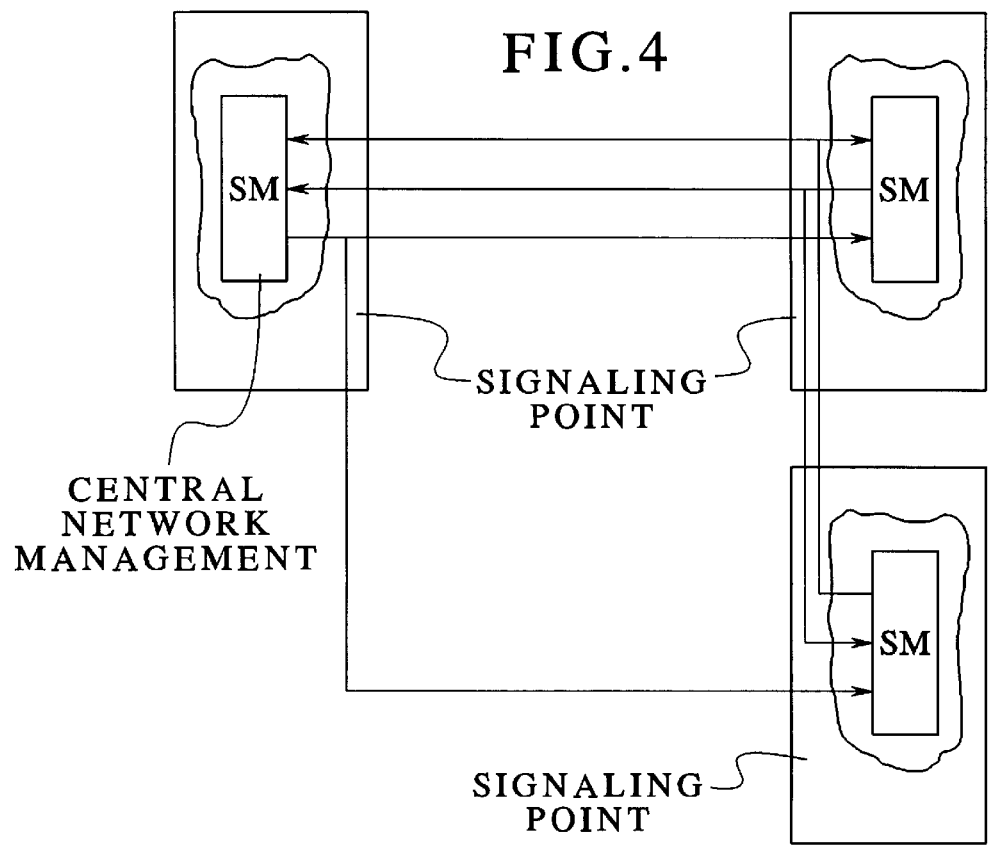
FIG. 4 shows an exemplary embodiment for the transmission of network management information during point-to-multipoint connections between signaling points.

Finally, FIG. 4 schematically shows an exemplary embodiment for the transmission of network management information between the signaling points of the communications network NW during a point-to-multipoint connection. Connections of this sort are used for the transmission of certain network management information that have effects on the overall network configuration, by means of a broadcasting to all adjacent signaling points or, respectively, to a group of these signaling points. Through such a group, for example, just one of the signaling points can be excluded. For such a broadcasting, in addition to the above-mentioned at least one virtual channel for the transmission of network management information on the respective transmission medium, at least one further virtual channel is reserved, allocated exclusively to network management information to be broadcasted. For an effective execution of a broadcasting, it is thereby useful to use an unsecured transmission method, while a secured transmission method is useful for point-to-point connections. As was explained on the basis of FIGS. 1 to 3, in the exemplary embodiment according to FIG. 4 one or several transmission media can also be provided between two adjacent signaling points.

Network management information emitted from the central network management means SM of a signaling point are forwarded to the relevant central network management means SM of the other signaling points by means of the coupling network associated with this signaling point, as well as possibly the coupling networks of other signaling points or cross-connects, using the respectively reserved virtual channel. A corresponding controlling of the coupling networks is already known, and is thus not described in more detail.

The previously mentioned forwarding of network management information to all the adjacent signaling points, with the exception of at least one signaling point, can moreover be realized in such a way that for this either separate virtual channels that exclude the respective signaling point or points are reserved, or else the setting of the coupling network is correspondingly dynamically modified, or else in the network management information an address ("point code") is transmitted, designating that signaling point that is to ignore this network management information.

In the exemplary embodiment according to FIG. 4, it is also useful that network management information received by the information processing means MH, which means are multiply present in the signaling points if warranted, are monitored in order to react directly to certain network management information in the way indicated above.

Finally, it is again to be noted that in the exemplary embodiments explained above, a flow control is carried out during the transmission of network management information, in order not to overload the central network management means of the individual signaling points during a burst-type occurrence of network management information from different directions. This flow control is thereby carried out directly by the network management means receiving the network management information. The flow control however does not affect the other signaling information transmitted via other virtual channels.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communications network operating according to an asynchronous transfer mode, the communications network having a plurality of network nodes connected with one another via at least one transmission medium, which, corresponding to a defined outband signaling, respectively represent at least one signaling point, comprising:

between adjacent signaling points of the plurality of network nodes, at least one virtual channel on the at least one transmission medium for transmission of signaling information defined according to a network protocol and for transmission of network management information; and at least one further virtual channel, allocated exclusively to the network management information, and reserved on the at least one transmission medium for transmission of the network management information between the adjacent signaling points.

2. The communications network according to claim 1, wherein a plurality of transmission media is respectively provided between adjacent signaling points, and wherein at least on one part of said plurality of transmission media, at least one virtual channel is reserved exclusively for transmission of the network management information.

3. The communications network according to claim 1, wherein a respective signaling point has at least one decentral information processing device, and has a central network management device, the network management information transmitted in the respective virtual channel being supplied directly to the central network management device.

4. The communications network according to claim 3, wherein the network management information supplied to the network management device is monitored by the information processing device, in order to be able to react directly to network management information.

5. The communications network according to claim 1, wherein for broadcasting network management information from a first signaling point to adjacent signaling points on the transmission media, at least one further virtual channel is respectively additionally reserved, and wherein distribution of the network management information to individual transmission media is carried out through a corresponding adjustment of a coupling network associated with a relevant signaling point of the adjacent signaling point.

6. The communications network according to claim 5, wherein for broadcasting network management information from a signaling point to all adjacent signaling points, as well as, to a group of adjacent signaling points excluding at least one of the adjacent signaling points, different virtual channels are reserved on the respective transmission medium.

7. The communications network according to claim 5, wherein when one of the adjacent signaling points is to be excluded from a broadcast of network management information from a transmitting signaling point, said exclusion of one of the adjacent signaling points is effected through a corresponding adjustment of the coupling network associated with the transmitting signaling point.

8. The communications network according to claim 5, wherein when one of the adjacent signaling points is to be excluded from a broadcast of network management information from a transmitting signaling point, all the adjacent signaling points are included in the broadcasting, and wherein the network management information has address information, which address information designates in which signaling point the network management information is to be ignored.

9. The communications network according to claim 1, wherein a flow control is provided and implemented during transmission of network management information via the respective virtual channel.

10. A communications network operating according to an asynchronous transfer mode, comprising:

a plurality of network nodes connected with one another via a plurality of transmission medium, which, corresponding to a defined outband signaling, respectively represent a plurality of signaling points;

between adjacent signaling points of the plurality of signaling points, at least one virtual channel on a respective transmission medium of the plurality of transmission medium for transmission of signaling information defined according to a network protocol and for transmission of network management information;

at least one further virtual channel, allocated exclusively to the network management information, and reserved on a respective transmission medium of the plurality of transmission medium for transmission of the network management information between adjacent signaling points of the plurality of signaling points; and at least one part of said plurality of transmission media having, at least one virtual channel reserved exclusively for transmission of the network management information.

11. The communications network according to claim 10, wherein a respective signaling point of the plurality of signaling points has at least one decentral information processing device, and has a central network management device, the network management information transmitted in the respective virtual channel being supplied directly to the central network management device.

12. The communications network according to claim 11, wherein the network management information supplied to the network management device is monitored by the information processing device, in order to be able to react directly to network management information.

13. The communications network according to claim 10, wherein a flow control is provided and implemented during transmission of network management information via the respective virtual channel.

14. A communications network operating according to an asynchronous transfer mode, comprising:

a plurality of network nodes connected with one another via a plurality of transmission medium, which, corresponding to a defined outband signaling, respectively represent a plurality of signaling points;

between adjacent signaling points of the plurality of signaling points, at least one virtual channel on a respective transmission medium of the plurality of transmission medium for the transmission of signaling information defined according to a network protocol and for transmission of network management information;

at least one further virtual channel, allocated exclusively to the network management information, and reserved on a respective transmission medium of the plurality of transmission medium for transmission of the network management information between respective adjacent signaling points of the plurality of signaling points; and broadcasting network management information on said at least one further virtual channel that is broadcast from a first signaling point to adjacent signaling points on the transmission media, distribution of the network management information to individual transmission media being carried out through a corresponding adjustment of a coupling network associated with a relevant signaling point of the adjacent signaling point.

15. The communications network according to claim 14, wherein for broadcasting network management information from a signaling point to all adjacent signaling points, as well as, to a group of adjacent signaling points, excluding at least one of the adjacent signaling points, different virtual channels are reserved on the respective transmission medium.

16. The communications network according to claim 14, wherein when one of the adjacent signaling points is to be excluded from a broadcast of network management information from a transmitting signaling point said exclusion of one of the adjacent signaling points is effected through a corresponding adjustment of the coupling network associated with the transmitting signaling point.

17. The communications network according to claim 14, wherein when one of the adjacent signaling points is to be excluded from a broadcast of network management information from a transmitting signaling point, all the adjacent signaling points are included in the broadcasting, and wherein the network management information has address information, which address information designates in which signaling point the network management information is to be ignored.

18. The communications network according to claim 14, wherein a flow control is provided and implemented during transmission of network management information via the respective virtual channel.

* * * * *